B. M. GRAYBILL.
APPARATUS FOR INDICATING FUEL CONSUMPTION.
APPLICATION FILED DEC. 30, 1915. RENEWED JUNE 11, 1919.
1,328,920.
Patented Jan. 27, 1920.
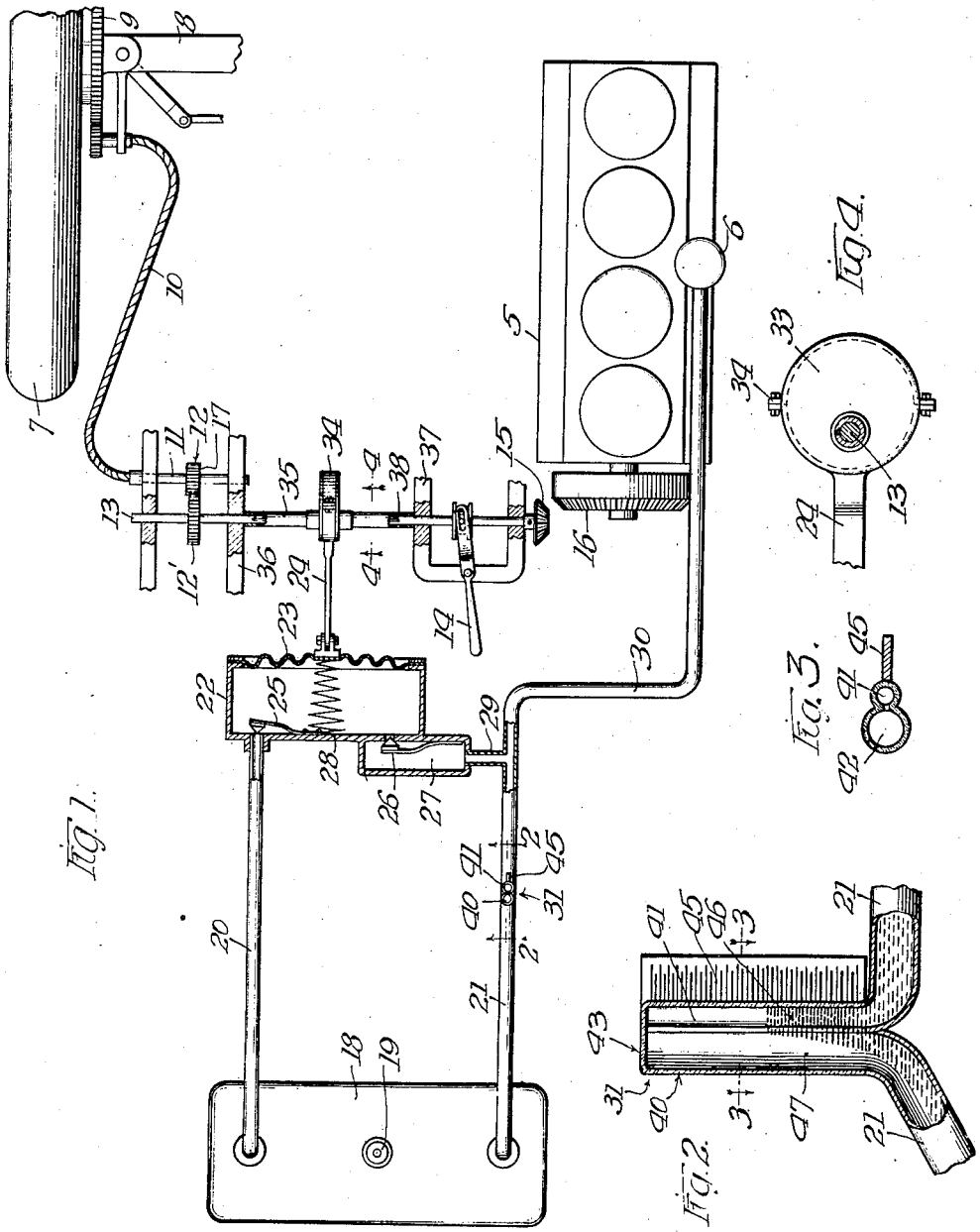

UNITED STATES PATENT OFFICE.

BIRD M. GRAYBILL, OF CHICAGO, ILLINOIS, ASSIGNOR TO STANLEY W. COOK, OF BROOKLINE, MASSACHUSETTS.

APPARATUS FOR INDICATING FUEL CONSUMPTION.

1,328,920.  Specification of Letters Patent.  Patented Jan. 27, 1920.

Application filed December 30, 1915, Serial No. 69,313. Renewed June 11, 1919. Serial No. 303,528.

*To all whom it may concern:*

Be it known that I, BIRD M. GRAYBILL, a citizen of the United States, residing at Chicago, in the county of Cook and State of Illinois, have invented certain new and useful Improvements in Apparatus for Indicating Fuel Consumption, of which the following is a specification.

My invention comprises a method of, and apparatus for securing a visible indication of the rate of fuel consumption of an engine.

More particularly the method provides for the operator of a gas engine, a visible indication at any time of the fuel efficiency of his engine. For example, the driver of a motor car can tell by a glance at an indicator on the dash whether his car is operating at its normal rate of eighteen miles per gallon of gasolene, or at only fifteen miles per gallon, which latter reading would instantly tell him that some condition of operation required attention. For instance his last supply of gasolene might have been of a poor grade, the carbureter might require adjustment, the valves need grinding or some other part require attention that would cause a lowering of the fuel efficiency of the engine.

The principal object of my invention is to provide the fuel supply system of an internal combustion engine with an indicator of such a nature as will give either by direct calibration, or by comparative reading a visible indication of the fuel efficiency of the engine. This efficiency or rate of fuel consumption obviously may be taken with respect to the engine speed, the load, the speed of the propelled mechanism or any other factor. For example, if used in connection with a motor car, the scale of the indicator may be either a straight numerical scale for giving comparative values, or may be calibrated to read in miles per gallon of fuel consumed, or in revolutions of the engine per unit (units for example such as the ounce, or the gill) of fuel used.

A still further object of the invention is to provide such a system in which the pump is driven in timed relation with either the engine or a part operatively connected with the engine and the quantity or rate of flow of the surplus fuel, that is the fuel not used by the engine, is measured before it is returned to the tank.

Other and further objects of my invention will become readily apparent to persons skilled in the art, from a consideration of the following description when taken in conjunction with the drawings, wherein Figure 1 is a schematic arrangement of pipes and other devices included in my fluid circulating system, with an indicator in a by-pass whereby to visually indicate the relative quantity of fuel being consumed by the engine proportional to the speed of the vehicle.

Fig. 2 is an enlarged section taken on line 2—2 of Fig. 1, showing the flow indicator.

Fig. 3 is a transverse section taken on line 3—3 of Fig. 2.

Fig. 4 is a transverse section, taken on line 4—4 of Fig. 1.

In all the views the same reference characters are employed to indicate similar parts.

In general my method comprises the supplying of an engine with an amount of fuel at all times in excess of its maximum demands and proportional to distance, it being a matter of selection whether the distance be in terms of piston travel, engine revolutions, distance traversed by a vehicle to which the engine is connected, or any other linear or angular distance, then diverting the surplus fuel over and above that used by the engine and measuring by means of a visible indicator, its rate of flow. In the drawings I have shown a simple form of apparatus of which the following is a description.

In the drawings 5 indicates an internal combustion engine provided with a carbureter 6. 7 is a wheel of an automobile chassis supported on the axle 8 and provided with a gear train 9 for rotating a flexible shaft 10, which is employed to rotate a counter-shaft 11, through a gear train 12 to rotate a pump shaft 13. The shaft 13 is adapted to be axially shifted, by means of a handle 14, so that the beveled gear pinion 15 will make driving connection with the bevel gear wheel 16 of the engine, at the same time the gear wheel 12' of the train 12 will become disconnected from the pinion 17. By this means either the wheel 7, of the vehicle chassis upon which the engine is located, may drive the pump shaft 13 or the engine may alternatively drive it direct. In starting the engine the pinion 15 and gear wheel 16 are in mesh.

A fuel tank 18, to hold gasolene, or like fuel, is provided with a vented closure 19, and connected therewith are pipes 20 and 21, which enter the upper wall of the tank and descend to the lowermost part thereof.

The pipe 20 is connected to a diaphragm pump 22, which is provided with a corrugated diaphragm 23, oscillated by the rod 24. A valve 25 closes the opening from the pipe 20, from the inside of the diaphragm pump, and a similar valve 26, contained in the chamber 27, closes the pump chamber from the other side of the wall 28, of said pump. The chamber 27 is connected by a pipe 29, with the pipe 21, the latter being a continuation of the pipe 30 that communicates with the carbureter 6. The pipe 21 is divided into two sections joined by an indicator or weir 31 through which the fuel not used by the carbureter is returned to the tank. The indicator is intended to visually show the quantity or rate of flow of the fluid returning to the tank 18. The pump 22 is operated by an eccentric 33 surrounded by a strap 34 that is connected to the eccentric rod 24. A tube 35 surrounds the shaft 13 and extends from a relatively stationary part of the frame 36 to a similar part of the frame 37. It is splined for a feather 38 and to this tube the eccentric 33 is keyed or otherwise positively secured. By this means the shaft 13 may be axially moved without disturbing the eccentric driving mechanism. The indicator 31 serves the function of visibly indicating to the operator the amount or rate of flow of the fluid which is not consumed by the engine and obviously may be of any suitable type. In the particular embodiment of my invention which I have illustrated I have provided a simple and inexpensive indicator consisting of two parallel tubes 40 and 41, made of glass or other transparent material, with a very fine vertical slot 42 extending through the partition wall between the tubes, the upper ends of which are closed as at 43. The lower end of the tube 41 which is relatively small in diameter as compared with tube 40 is connected with a section of the pipe 21 into which the surplus fuel is passed, and the other tube 47 is connected with the section of pipe 21 which extends to the tank or reservoir 18. The scale 45 secured beside the smaller tube 41 is divided for the purpose of giving comparative readings or obviously may be calibrated to read, for example in miles per gallon, or revolutions per unit fuel consumed.

The operation of the particular system illustrated is as follows:—After the engine 5 has been started the lever 14 is shifted, to move the shaft 13 axially, so that the gear wheel 12' will make driving connection with the pinion 12 and disconnect pinion 15 from gear wheel 16. After this has been done, the pump 22 will be operated by the wheel 7 of the vehicle through the flexible shaft 10. The flexible diaphragm 23 will be forced inwardly and outwardly of the pump casing to close and open the valves 25 and 26, respectively, to pump the fluid fuel from the reservoir 18 into the pipes 21 and 30. If the float in the conventional carbureter 6 has closed the valve communicating with the float chamber thereof, then all of the gasolene moved by the pump will pass through the by-pass pipe 21 and through the indicator 31 back to the tank or reservoir 18. The velocity and quantity of the fluid passing through the by-pass pipe 21 will vary the head in the tube 41 of the indicator. The more rapidly the fluid is pumped from the reservoir, the higher will be the head 46 in the tube 41. The head 46 will, therefore, be varied by the variation of speed of the wheel 7, so that the indicator 31 will show the amount of fluid that is being pumped from the reservoir and which is not consumed by the engine. The capacity of the slot 42 is very much smaller than is the capacity of the tube 41 and therefore the fluid cannot escape from the tube 41 of the indicator into the tube 40 as rapidly as it may accumulate in the tube 41, and therefore the height of the head in tube 41 will be plainly visible. Now, if in the example, the speed of the automobile does not vary and the carbureter calls for a considerable portion of the fluid that is being circulated by the pump, the head in the tube 41 as indicated by the scale will become visually manifest and in this manner there will be indicated upon the scale 45, after the device has been properly calibrated, the quantity of gasolene used per mile by the engine. Now if the speed of the vehicle becomes accelerated and the quantity of gasolene used thereby remains the same, the head 46 in the tube 41 will rise still farther and indicate a smaller quantity of gasolene used per mile.

The pump 22 will have a capacity for delivering to the pipe 30 all of the gasolene that can be used through the carbureter 6 by the engine when operating at its fullest loaded capacity and the excess of this quantity will be returned through the bypass pipe 21, and as shown by the indicator 31, the difference being the amount consumed by the engine.

In order that the particular form of indicator illustrated may operate reliably under all conditions of fuel supply it is essential that it should be located at a higher altitude than the tank 18 so that the pipe 21, between the indicator and the tank will readily be discharged and in which the liquid will not accumulate or be affected by the liquid in the tank to disturb the readings.

I have made the pump 22 operable with a diaphragm because this form of pump is at all times liquid tight and requires no lubrication and is not dependable for its liquid holding integrity upon a close fit between the piston and the cylinder, as in pumps of the plunger or piston type, and furthermore, it is not affected by grit or dust or accumulation of grease and dirt of any kind.

The indicator 31 may be placed at any convenient point within the vision of the operator of the automobile, so that the flow of gasolene through the pipe supplying the engine may at all times be observed.

Having described my invention, what I claim is:

1. Method of continuously indicating the rate of fuel consumption of an internal combustion engine which consists in supplying to the engine an amount of fuel variable with the speed of the engine and at all times in excess of the maximum demands thereof, diverting the excess fuel over and above that utilized by the engine, and visibly indicating the rate of flow of the diverted fuel.

2. The method of continuously indicating the rate of fuel consumption of an internal combustion engine which consists in supplying the engine with an amount of fuel variable with the speed of the engine and at all times in excess of the maximum demands thereof, diverting the excess fuel over and above that utilized by the engine, returning the diverted fuel to the source of supply, and visibly indicating the rate of flow of the diverted fuel.

3. The method of continuously indicating the rate of fuel consumption of an internal combustion engine which consists in supplying the engine with an amount of fuel variable with the speed of the engine and at all times in excess of the maximum demands thereof, diverting the excess fuel over and above that utilized by the engine, passing the diverted fuel over a weir, and visibly indicating the head on the weir.

4. The method of continuously indicating the rate of fuel consumption of the carbureter of an internal combustion engine, which consists in supplying the carbureter with an amount of fuel variable with the speed of the engine and at all times in excess of the maximum demands thereof, passing the excess fuel over and above that utilized by the carbureter through a vertical slot positioned higher than the carbureter and vertically extended to permit free efflux of the excess of fuel, and visibly indicating the height of the fuel flowing through the slot.

5. The method of continuously indicating the number of units of distance traversed by a vehicle propelled by an internal combustion engine, per unit of fuel consumed by the engine which consists in supplying the engine with fuel proportional to the rate of travel and at all times in excess of the maximum demands of the engine, diverting the excess of fuel over and above that utilized by the engine, and visibly indicating the rate of flow of the diverted fuel.

6. The method of continuously indicating the number of units of distance traversed by a vehicle propelled by an internal combustion engine, per unit of fuel consumed by the engine which consists in supplying the engine with fuel proportional to the rate of travel and at all times in excess of the maximum demands of the engine, diverting the excess of fuel over and above that utilized by the engine, returning the diverted portion of the fuel to the source of supply, and visibly indicating the rate of flow of said fuel returned to the supply.

7. The method of continuously indicating the number of units of distance traversed by a vehicle propelled by an internal combustion engine, per unit of fuel consumed by the engine which consists in supplying the engine with fuel proportional to the rate of travel and at all times in excess of the maximum demands of the engine, permitting the free overflow of the surplus fuel and continuously indicating visibly the surface level of the fuel at the point of overflow.

8. The method of continuously indicating the number of units of distance traversed by a vehicle propelled by an internal combustion engine, per unit of fuel consumed by the engine which consists in supplying the engine with fuel proportional to the rate of travel and at all times in excess of the maximum demands of the engine, diverting the excess fuel over and above that utilized by the engine, permitting the free overflow of the diverted fuel through a vertically extensive opening, and continuously indicating visibly the surface level of said fuel at the point of overflow.

9. The combination with an internal combustion engine of variable means for supplying fuel to the engine at all times in excess of the maximum demands thereof, a conduit for diverting the excess fuel over and above that utilized by the engine, and a gage for constantly indicating visibly the rate of fuel flow through said conduit.

10. The combination with an internal combustion engine, of means variable with the speed of the engine for supplying fuel to the engine at all times in excess of the maximum demands thereof, a conduit for diverting the excess fuel over and above that utilized by the engine, and a gage for constantly indicating visibly the rate of fuel flow through said conduit.

11. The combination with an internal combustion engine, of a source of fuel supply, means operating in timed relation with the engine for supplying the engine at all times with an amount of fuel in excess of its maximum demands, a conduit for returning to the source of supply that portion of the fuel over and above that which is utilized by the engine, and means for constantly indicating visibly the rate of flow in said conduit.

12. The combination of an internal combustion engine of means variable with the speed of the engine for supplying fuel to the engine at all times in excess of the maximum demand thereof, a conduit for diverting the excess fuel, a weir in said conduit, and means for visibly indicating the head on said weir.

13. The combination with an internal combustion engine, of a source of fuel supply, means operating in timed relation with the engine for supplying the engine at all times with an amount of fuel in excess of its maximum demand, a conduit for returning to the source of supply that portion of the fuel over and above that which is utilized by the engine, and an indicator connected in said conduit and comprising a pair of adjacent tubes connected at their lower ends in the conduit, the tube into which the fuel is forced being transparent and having a vertically elongated aperture connecting it with the other tube.

14. The combination with an engine and means operating in timed relation with the engine for supplying a surplus of fuel to the engine, an overflow duct for the surplus fuel, over and above that utilized by the engine, said duct having an opening of a height sufficient to permit at all times the continuous free escape of the surplus fuel therethrough, and means for visibly indicating the level of the fuel flowing through said opening.

15. The combination with an engine and means operating in timed relation with the engine for supplying a surplus of fuel to the engine, an overflow duct for the s fuel, over and above that utilized by the engine, said duct having an opening to permit continuous escape of the surplus fuel therefrom, and means for visibly indicating the rate of fuel escape through said opening.

16. The combination with an engine and means operating in timed relation therewith for supplying a surplus of fuel to the engine, an overflow duct for the surplus fuel, said duct having a vertically disposed aperture to permit continuous overflow of t surplus therefrom, and a scale member for visibly indicating the height of the overflow above the bottom of the aperture.

17. The combination with an engine and a carbureter of a liquid fuel reservoir therefor, a pipe connecting said carbureter and reservoir, a pump in said pipe operating in timed relation with the engine for supplying at all times an excess of fuel, a conduit leading into said pipe between the carbureter and pump for receiving the surplus fuel over and above that utilized by the engine, said conduit having an opening at a point higher than the carbureter to permit continuous escape of the surplus fuel and means for continuously indicating visibly the overflow head.

18. The combination with an engine and a carbureter, of a liquid fuel reservoir therefor, a pipe connecting said carbureter and reservoir, a pump in said pipe operating in timed relation with the engine for supplying at all times an excess of fuel, a conduit leading into said pipe between the carbureter and pump for receiving the surplus fuel over and above that utilized by the engine, said conduit having an opening at a point higher than the carbureter to permit continuous escape of the surplus fuel, means for continuously indicating visibly the overflow head, and a second conduit for receiving the overflow and returning the same to the fuel reservoir.

19. The combination with an engine and a carbureter, of a liquid fuel reservoir therefor, a pipe connecting said carbureter and reservoir, a pump in said pipe line operating in timed relation with the engine for supplying at all times an excess of fuel, a conduit leading into said pipe between the carbureter and pump for receiving the surplus fuel over and above that utilized by the engine, said conduit having a narrow vertical slot therein at a point higher than the carbureter to permit continuous escape of the surplus fuel, and means for continuously indicating visibly the depth of the fuel overflow through said slot.

20. In a system of the character described, the combination with a vehicle, of an engine for propelling the same, a fuel reservoir, a pipe connecting said reservoir and engine, a pump in said pipe line operating in timed relation to the speed of the vehicle for supplying to the engine an amount of fuel at all times over and above its maximum consumption, a conduit for returning to the fuel reservoir the surplus fuel over and above that utilized by the engine, and means for indicating the rate of flow of the fuel through said conduit.

21. In a system of the character described the combination with a vehicle, of an engine for propelling the same, a fuel reservoir, a pipe connecting said reservoir and engine, a pump in said pipe operating in timed relation to the speed of the vehicle for supplying fuel to the engine at all times in excess of its demand, a conduit for receiving the surplus fuel, said conduit having an opening therein to permit the continuous overflow of the surplus fuel, and means for continuously indicating visibly the rate of overflow from said opening.

22. In a system of the character described, the combination of the traction wheels of an automobile, a driving engine geared thereto, a fuel reservoir, a pipe connecting said reservoir and engine, a pump in said line of pipe for causing the liquid to flow from said reservoir to said engine, a return pipe connected to the aforesaid pipe between the engine and pump, and an indicator in said return pipe to constantly display visibly the rate of flow of the liquid passing therethrough.

23. In a system of the character described, the combination of a self-propelled vehicle, a driving engine mounted thereon, a carbureter for the said engine, a fuel reservoir, a pipe connecting said reservoir and carbureter, a pump in said pipe between the reservoir and carbureter, means for operating said pump proportionally to the speed of the vehicle, a second pipe leading at one end into the aforesaid pipe at a point between the pump and carbureter and at its opposite end leading to the fuel reservoir, and an indicator in the last mentioned pipe to constantly indicate visibly the quantity of fluid passing therethrough.

24. In a system of the character described, the combination of a self-propelled vehicle, a driving engine mounted thereon; a carbureter therefor, a fuel reservoir, a pipe connecting said reservoir and carbureter; a pump in said line of pipe, means operating said pump for alternative connection with said engine and with the running gear of said vehicle, and an indicator associated with said pipe whereby to determine the rate of fuel consumed by the carbureter.

25. In a system of the character described, the combination with a vehicle of a vehicle propelling engine; a liquid fluid reservoir therefor, a pipe connecting said reservoir and engine means for causing flow of fuel through said pipe in accordance with the speed of the vehicle, and means for visibly indicating the rate of fuel consumption of the engine.

26. In a system of the character described, the combination of a self-propelled vehicle, a driving engine geared thereto for propelling the vehicle, a carbureter for the engine, a fuel reservoir, a pipe connecting said reservoir and carbureter, means in said line of pipe for supplying fuel to the carbureter at all times in excess of the maximum demands thereof and proportional to the rate of travel, a duct for diverting the excess fuel, said duct having a vertically elongated opening through which the excess fuel is freely discharged, and a gage for constantly indicating visibly the fuel level at the discharge point.

27. In a system of the character described, the combination of a self-propelled vehicle, a driving engine geared thereto for propelling the vehicle, a carbureter for the engine, a fuel reservoir, a pipe connecting said reservoir and carbureter, means in said line of pipe for supplying fuel to the carbureter at all times in excess of the maximum demands thereof and proportional to the rate of travel, a duct for diverting the excess fuel, an overflow port in said duct through which the excess fuel freely flows, the vertical height of the port being such that the fuel cannot normally contact with the top thereof, and a gage for constantly indicating visibly the fuel level at the point of overflow.

In testimony whereof I hereunto set my hand in the presence of two subscribing witnesses.

BIRD M. GRAYBILL.

In the presence of—
 FORÉE BAIN,
 MARY F. ALLEN.